United States Patent [19]

Horling et al.

[11] Patent Number: 4,584,749
[45] Date of Patent: Apr. 29, 1986

[54] METHOD FOR MAKING CAGES FOR ROLLING BEARINGS

[75] Inventors: Peter Horling, Mainberg; Norbert Klupfel, Hambach; Herbert Dobhan, Bergrheinfeld; Volker Dibal, Schweinfurt, all of Fed. Rep. of Germany

[73] Assignee: SKF Kugellagerfabriken GmbH, Schweinfurt, Fed. Rep. of Germany

[21] Appl. No.: 632,320

[22] Filed: Jul. 19, 1984

[30] Foreign Application Priority Data

Jul. 20, 1983 [DE] Fed. Rep. of Germany ....... 3326121

[51] Int. Cl.[4] .................. B21D 53/12; B21K 1/05; B26D 3/00
[52] U.S. Cl. .................. 29/148.4 C; 29/DIG. 37; 83/54; 83/620; 384/572; 384/575
[58] Field of Search .................. 384/575, 572; 83/620, 83/54; 29/148.4 C, 148.4 R, DIG. 37

[56] References Cited

U.S. PATENT DOCUMENTS

| 930,933 | 8/1909 | Stover | 83/620 |
|---|---|---|---|
| 1,395,385 | 11/1921 | Buckwalter | 384/575 |
| 1,404,383 | 1/1922 | Flaherty | 384/575 |
| 1,427,520 | 8/1922 | Close | 384/575 |
| 1,477,164 | 12/1923 | Close | 384/572 |
| 1,712,076 | 5/1929 | Hughes | 29/148.4 C |
| 3,080,639 | 3/1963 | Maurizi et al. | 29/148.4 C |
| 3,314,737 | 4/1967 | Alhman | 29/148.4 C X |
| 3,365,775 | 1/1968 | Cavagnero et al. | 384/575 X |
| 3,499,200 | 3/1970 | Wilson | 29/148 |
| 4,337,680 | 7/1982 | Borzym | 83/54 X |

Primary Examiner—Mark Rosenbaum
Assistant Examiner—Ronald S. Wallace
Attorney, Agent, or Firm—Eugene E. Renz, Jr.

[57] ABSTRACT

The invention pertains to a process and a device for the production of pocket cages for roller bearings. The starting material is a cup-shaped blank or a tube, and the lateral surfaces of the cage are cut at the same time that the rolling element pockets are stamped out. In this way a work step on a separate processing machine is eliminated.

1 Claim, 3 Drawing Figures

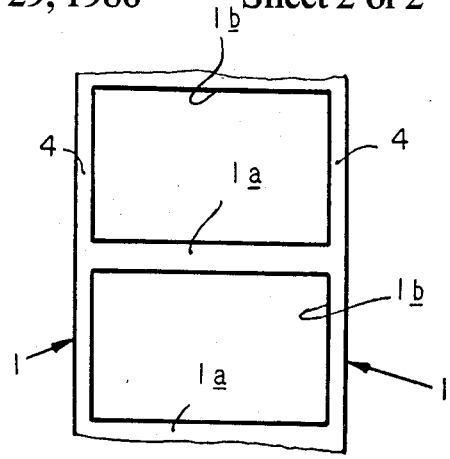
FIG. 2
FIG. 3
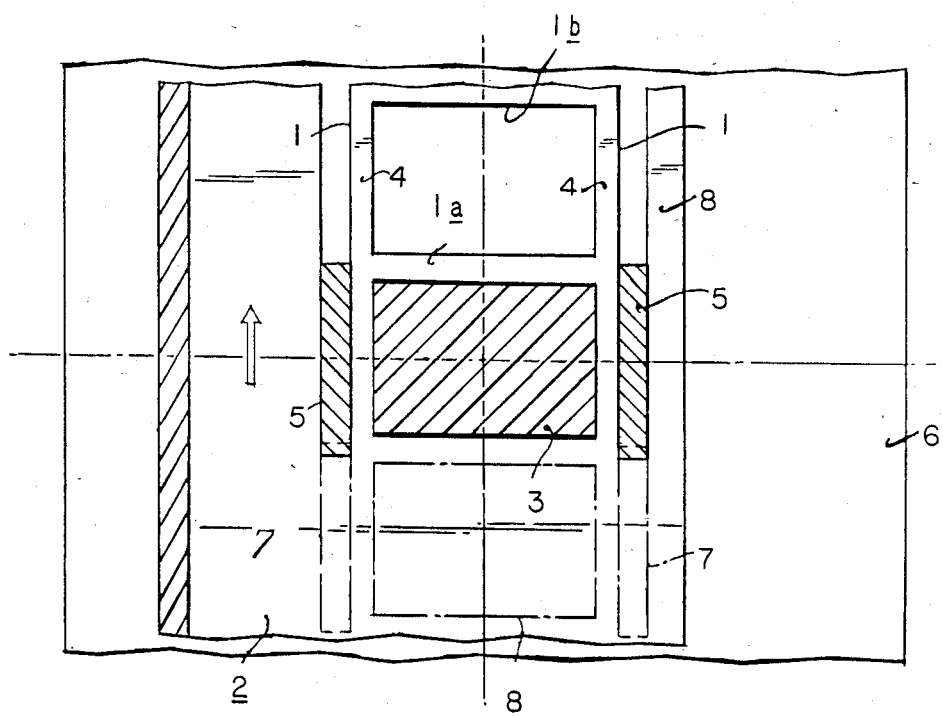

METHOD FOR MAKING CAGES FOR ROLLING BEARINGS

BACKGROUND OF THE INVENTION

The present invention relates to method and apparatus for making pocket-type cages for rolling bearings.

Cylindrical cages for rolling bearings are often made from tubular stock wherein a ring of appropriate width is first cut off and then the pockets for the rolling elements are punched out stepwise around the periphery of the tube. This then involves two sequential work steps on different processing machines which means that increased expense is incurred for the total production process. U.S. Pat. No. 1,477,164 shows another well-known process for making cages wherein a cup-shaped intermediate product is formed from flat sheet material and then the pockets for the rolling elements are formed therefrom. Conical cages can also be produced by this process. It is noted, however, that if the bottom of the cup produced by deep drawing is not desired, it must be punched out in an additional work step. Even though the quality of the end products produced by these processes is generally satisfactory, the total production process as a whole is relatively expensive.

SUMMARY OF THE PRESENT INVENTION

With the foregoing in mind, it is an object of the present invention to provide a more simplified and inexpensive method and apparatus for producing pocket cages for rolling bearings. To this end, and in accordance with the present invention, the rolling element pockets and at least one lateral surface of the cage are formed simultaneously in one operation. Accordingly, when, for example, the starting material is a tubular element, the trimming or cutting step which previously had to be carried out in a second processing apparatus can advantageously be omitted. Thus, the entire length of the tubular member may be utilized as a semi-finished product in a punching device which punches out the pockets for the rolling elements in stepwise fashion and simultaneously trims the cage from the remainder of the tube. This can be achieved in a particularly effective manner by trimming the lateral surfaces by means of a device used for forming, for example, by punching out the rolling element pockets. This device may consist of a die stamp for the rolling element pockets and at least one punch which is separated from the stamp by a distance equal to the width of a lateral ring of the cage and which has a cutting length equal at least to the width of a rolling element pocket plus the width of a cross piece in the peripheral direction. In this manner, one of the lateral surfaces of the cage is trimmed in the same work step wherein the punching tool forms one of the rolling element pockets. The stamping element in this instance is somewhat wider than the spacing length of the rolling element pockets in the peripheral direction in order to provide for an overlap of the cutting lengths around the periphery thereby ensuring the cage will be separated from the tubular member reliably.

In accordance with the method of the present invention, this can be achieved in one of two ways; either the free end of the tubular member which has already been stamped to provide the rolling element pockets in a preceding step is separated when the rolling element pockets are stamped out for the next cage or the cage is separated from the tubular member when its own rolling element pockets are formed by the punching operation.

In accordance with a modification of the method and apparatus of the present invention, the punching tool may comprise two stamps for the lateral surfaces and another stamp disposed therebetween for forming the rolling element pockets. This method and apparatus can be used advantageously when the cage is produced from cup-shaped intermediate products or members. For example, when the cup is deep drawn from flat sheet material, the edge area is usually not useable as a lateral surface for the cage without further processing. If a cylindrical cage is produced therefrom, it is, therefore, advisable to provide on either side of the main forming or punching tool for the rolling element pockets, cutting tools for producing the lateral outer edge surfaces. In this instance, the distance apart is equal to the width of the annular ring portions of the cage. Thus, as the rolling element pockets are formed by punching in a stepwise fashion, the lateral surfaces of the cage are produced simultaneously.

The method and apparatus of the present invention are capable of producing considerable savings in production of pocket-type cages and result in a great economy in the cost for the finished product. Existing conventional stamping apparatus can usually be employed to carry out the method of the present invention.

BRIEF DESCRIPTION OF THE DRAWINGS

These and other objects of the present invention and the various features and details of the method and apparatus for forming cages is hereinafter more fully set forth with reference to the accompanying drawings, wherein;

FIG. 2 is a fragmentary plan view of the finished cage made in accordance with the method and apparatus illustrated in FIG. 1; and FIG. 3 is a fragmentary view of the cage.

DESCRIPTION OF THE PREFERRED EMBODIMENTS

Figure 1:
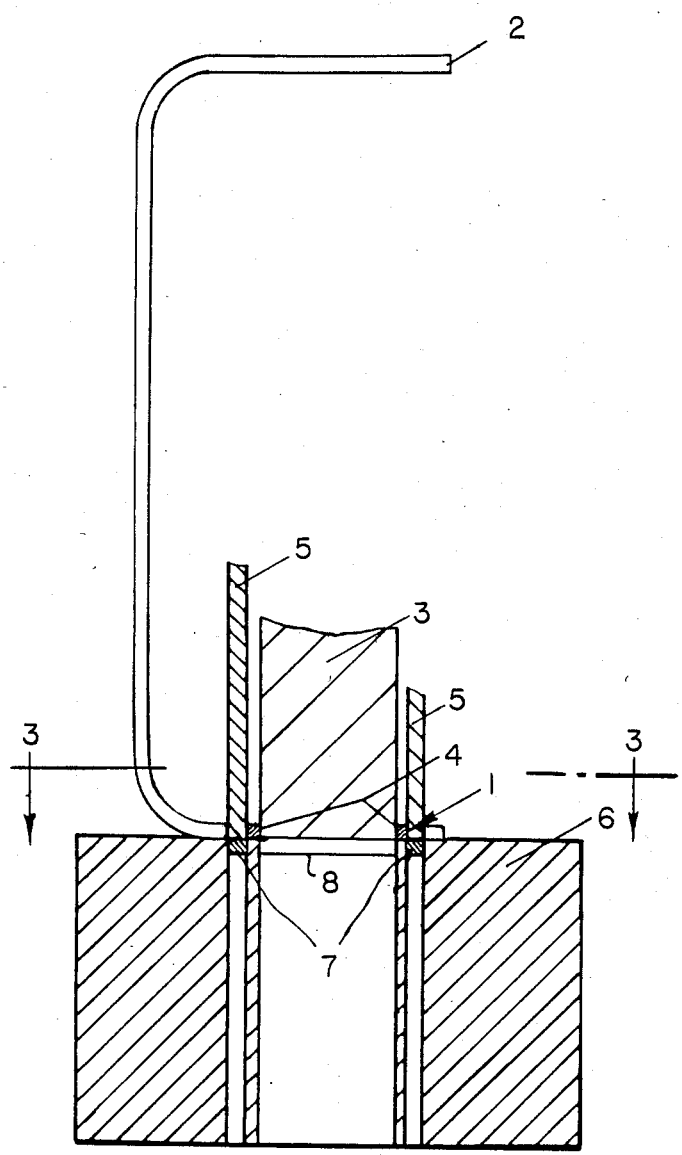
FIG. 1 is a schematic longitudinal sectional view of apparatus for forming by punching cages for rolling bearings.

Referring now to the drawings and particularly to FIG. 1 thereof, there is illustrated schematically apparatus and method for forming the pockets and simultaneously the outer peripheral surfaces 1 of a cylindrical cage for rolling bearings. The finished cage comprises a pair of axially spaced, circumferentially extending ring members 4 and a plurality of cross pieces or bars 1a circumferentially spaced to define pockets 1b for the rolling elements. In the present instance the intermediate product 2 is cup-shaped and may be formed by deep drawing a flat sheet material which then is set up in stamping and cutting apparatus for further processing. The apparatus comprises essentially a movable tool part such as a stamp 3 for stamping out a roller element pocket 1a and a pair of punches 5 disposed on both sides a distance equal to the width of the annular ring portions 4 of the cage and a stationary tool part 6 which has corresponding recesses for the actuatable tool parts 3, 5. The pockets 1b for the rolling elements are stamped out in a stepwise manner as the cup-shaped intermediate blank 2 is intermittently rotated and positioned to form the adjacent rolling element pockets. The outer lateral surfaces 1 of the cage pocket formed in this manner are also cut in a stepwise fashion. The punching elements 5 are, therefore, wider when seen in the peripheral direction of the cage. This amounts to at least the width of a rolling element pocket plus the width of a cross piece 1a so that the cuts overlap. In the axial direction, punches 5 are relatively narrow so that the waste 7 formed from the cutting operation can be minimized. Note, that punch 5 at the edge of the cup-shaped blank 2 spans or covers only a narrow edge area so that only a small amount of waste 7 is produced. Additionally waste pieces 8 corresponding to the size of the rolling element pockets is also formed in the stamping operation. It is noted that the cup-shaped blank is supported by clamping for stepwise rotation in the formation process in a known manner by means not shown.

FIG. 2 shows a cage produced in the manner described above. The outer lateral side edge surfaces 1 are formed at the same time that the pockets for the rolling elements are stamped out stepwise in the manner described above.

Even though the apparatus and method have been described in connection with a cage for a cylindrical roller bearing, it is, of course, to be understood that the invention has useful application to cages for other types of bearings such as ball bearings, conical roller bearings, spherical roller bearings or needle bearings.

What is claimed is:

1. A method for making cages for rolling bearings from tubular members, the cage comprising a pair of axially spaced circumferentially extending ring members and a plurality of cross pieces connecting the ring members and circumferentially spaced to define pockets for the rolling elements consisting of the steps of stamping one of the pockets from the tubular member and simultaneously trimming by means of punching elements, the tubular member at axially spaced locations on either side of the pocket to form annular ring portions of the cage and rotating the tubular member and repeating the stamping and trimming steps until the cage is completely formed, the punching elements having a predetermined dimension in the peripheral direction equal to at least the width of a pocket and the width of a cross piece so that the trimming cuts overlap during the cage-forming process.

* * * * *